(12) United States Patent
Jeon et al.

(10) Patent No.: US 11,621,791 B2
(45) Date of Patent: Apr. 4, 2023

(54) APPARATUS AND METHOD FOR PRECISE POSITIONING BASED ON DEEP LEARNING

(71) Applicant: Electronics and Telecommunications Research Institute, Daejeon (KR)

(72) Inventors: Ju-Il Jeon, Daejeon (KR); Young-Su Cho, Daejeon (KR); Myung-In Ji, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 63 days.

(21) Appl. No.: 17/333,910

(22) Filed: May 28, 2021

(65) Prior Publication Data

US 2022/0006543 A1 Jan. 6, 2022

(30) Foreign Application Priority Data

Jul. 1, 2020 (KR) .......................... 10-2020-0080965

(51) Int. Cl.
| | | |
|---|---|---|
| H04B 17/391 | (2015.01) | |
| H04W 72/0453 | (2023.01) | |
| H04B 7/06 | (2006.01) | |
| H04B 17/27 | (2015.01) | |
| H04L 5/00 | (2006.01) | |

(52) U.S. Cl.
CPC ......... *H04B 17/391* (2015.01); *H04B 7/0626* (2013.01); *H04B 17/27* (2015.01); *H04L 5/0007* (2013.01); *H04W 72/0453* (2013.01)

(58) Field of Classification Search
CPC ............................... H04W 64/00; H04B 17/27
See application file for complete search history.

(56) References Cited

U.S. PATENT DOCUMENTS

| | | | |
|---|---|---|---|
| 10,178,571 | B2 | 1/2019 | Park et al. |
| 2018/0096222 | A1 | 4/2018 | Yoon et al. |
| 2019/0164301 | A1 | 5/2019 | Kim |
| 2020/0163040 | A1 | 5/2020 | Trichopoulos et al. |
| 2021/0176726 | A1* | 6/2021 | Vyunova ............... H04W 4/021 |
| 2021/0329416 | A1* | 10/2021 | Li ........................ H04B 17/318 |
| 2022/0053285 | A1* | 2/2022 | Shu ....................... H04W 4/023 |

FOREIGN PATENT DOCUMENTS

| | | |
|---|---|---|
| KR | 101638745 B1 | 7/2016 |
| KR | 1020190072900 A | 6/2019 |
| KR | 102116824 B1 | 6/2020 |
| WO | 2016032200 A2 | 3/2016 |

* cited by examiner

*Primary Examiner* — Kevin Kim
(74) *Attorney, Agent, or Firm* — William Park & Associates Ltd.

(57) ABSTRACT

Disclosed herein are an apparatus and method for precise positioning based on deep learning. The method performed by the apparatus includes setting a collection location and a collection environment, collecting wireless signal data based on the collection location and the collection environment, generating a magnitude map image for training from the wireless signal data, and generating a positioning DB model by learning the image characteristics of the magnitude map image for training through deep-learning-based training.

10 Claims, 16 Drawing Sheets

APPARATUS AND METHOD FOR PRECISE POSITIONING BASED ON DEEP LEARNING

CROSS REFERENCE TO RELATED APPLICATION

This application claims the benefit of Korean Patent Application No. 10-2020-0080965, filed Jul. 1, 2020, which is hereby incorporated by reference in its entirety into this application.

BACKGROUND OF THE INVENTION

1. Technical Field

The present invention relates generally to positioning technology based on wireless communication signals, and more particularly to positioning technology based on deep learning.

2. Description of the Related Art

Research into technology for predicting locations using wireless communication infrastructure depending on the type of infrastructure and service method is underway.

A Global Navigation Satellite System (GNSS) is a technology for predicting the location of a user using satellite signals on the Earth's orbit. The GNSS provides high positional accuracy within 10 m and availability in a place like a wide open area, but in downtown places, a location error increases. Reception sensitivity is particularly degraded indoors, and the case in which a location cannot be identified because a signal cannot be received frequently occurs.

Location estimation technology based on a cellular network, among wireless communication infrastructure, is technology for estimating the location of a user using the location of a mobile communication base station or a repeater, signal strength, and the like. However, because information about the locations of a base station and a repeater is required, this technology has been developed mainly by communication companies, but the positioning accuracy thereof is not that high, because the base station and the repeater cover a wide area.

In the case of indoor positioning, location estimation technology using Wi-Fi has been developed. This method is configured such that the strength of a received signal at each location is collected using a corresponding Wi-Fi AP present in a service area, a database is constructed with the strength values of the received signals, and the database is searched for a pattern that is most similar to the pattern of the strength of the signal received at the current location of a user terminal, whereby the current location is estimated. Because it has relatively high accuracy, the location estimation technology based on Wi-Fi can be applied to an indoor navigation service, but a lot of time and expense is consumed to collect Wi-Fi signals, and there are obstacles to deploying APs in all buildings.

In wireless communication systems, data is transmitted over a wireless channel, and signals may be distorted during transmission. Also, departing from the use of a single transmission antenna and a single reception antenna for transmission of packets, most recent mobile communication systems employ a method of improving the efficiency of transmitted and received data using multiple transmission antennas and multiple reception antennas. When multichannel and multi-antenna wireless signal data is used, high accuracy may be achieved even when positioning is performed using data of only a single base station.

Meanwhile, computers having simple computation capabilities are not able to differentiate between a cat and a dog in a picture. Humans can easily and intuitively differentiate between a cat and a dog after infancy, but computers can distinguish the same only after undergoing a complicated computing process. In order to improve accuracy of such discrimination, a machine-learning method has been invented, and a method of improving accuracy by increasing the number of layers for identifying training data, among the machine-learning methods, is called 'deep learning'. Deep learning enables simply identifying a line or color at first, but makes it possible to recognize a shape later and to finally identify an abstract level.

Accordingly, the present invention presents a method for precise positioning based on deep learning using multichannel or multi-antenna wireless signal data.

Meanwhile, Korean Patent Application Publication No. 10-2019-0072900, titled "Apparatus and method for wireless location using deep learning", discloses an apparatus and method for wireless location using deep learning, which are configured to learn signal characteristics from a wireless signal and calculate location information from the actual wireless signal data for location.

SUMMARY OF THE INVENTION

An object of the present invention is to improve the low positioning accuracy of an existing positioning method that uses the location of a base station and signal strength and to provide positioning in places in which GPS is not available.

Another object of the present invention is to provide positioning technology having high precision based on wireless communication infrastructure in various fields through a general-purpose and more precise positioning method, rather than depending on communication companies and information about repeaters and base stations.

In order to accomplish the above objects, a method for precise positioning based on deep learning, performed by an apparatus for precise positioning based on deep learning, according to an embodiment of the present invention includes setting a collection location and a collection environment, collecting wireless signal data based on the collection location and the collection environment, generating a magnitude map image for training from the wireless signal data, and generating a positioning DB model by learning the image characteristics of the magnitude map image for training through deep-learning-based training.

Here, the wireless signal data may be a Channel State Information Reference Signal (CSI-RS).

Here, the magnitude map image may be a graph that represents the magnitude data of a frequency response for each subcarrier of the CSI-RS.

Here, the magnitude map image may be the graph in which the magnitude data of a frequency response for each OFDM symbol index is further considered, in addition to the magnitude data of the frequency response for the each subcarrier.

Here, the magnitude map image may be the graph represented as multiple graphs so as to correspond to CSI-RSs collected from multiple channels in the collection location.

Here, generating the positioning DB model may be configured to generate the positioning DB model by learning the image characteristics of the magnitude map image for training and information about the collection location of the wireless signal data through the deep-learning-based training.

Here, the image characteristics may be the number of graphs and the patterns thereof.

Also, in order to accomplish the above objects, an apparatus for precise positioning based on deep learning according to an embodiment of the present invention includes one or more processors and executable memory for storing at least one program executed by the one or more processors. The at least one program may be configured to set a collection location and a collection environment, to collect wireless signal data based on the collection location and the collection environment, to generate a magnitude map image for training from the wireless signal data, and to generate a positioning DB model by learning the image characteristics of the magnitude map image for training through deep-learning-based training.

Here, the wireless signal data may be a Channel State Information Reference Signal (CSI-RS).

Here, the magnitude map image may be a graph that represents the magnitude data of a frequency response for each subcarrier of the CSI-RS.

Here, the magnitude map image may be the graph in which the magnitude data of a frequency response for each OFDM symbol index is further considered, in addition to the magnitude data of the frequency response for the each subcarrier.

Here, the magnitude map image may be the graph represented as multiple graphs so as to correspond to CSI-RSs collected from multiple channels in the collection location.

Here, the at least one program may generate the positioning DB model by learning the image characteristics of the magnitude map image for training and information about the collection location of the wireless signal data through the deep-learning-based training.

Here, the image characteristics may be the number of graphs and the patterns thereof.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
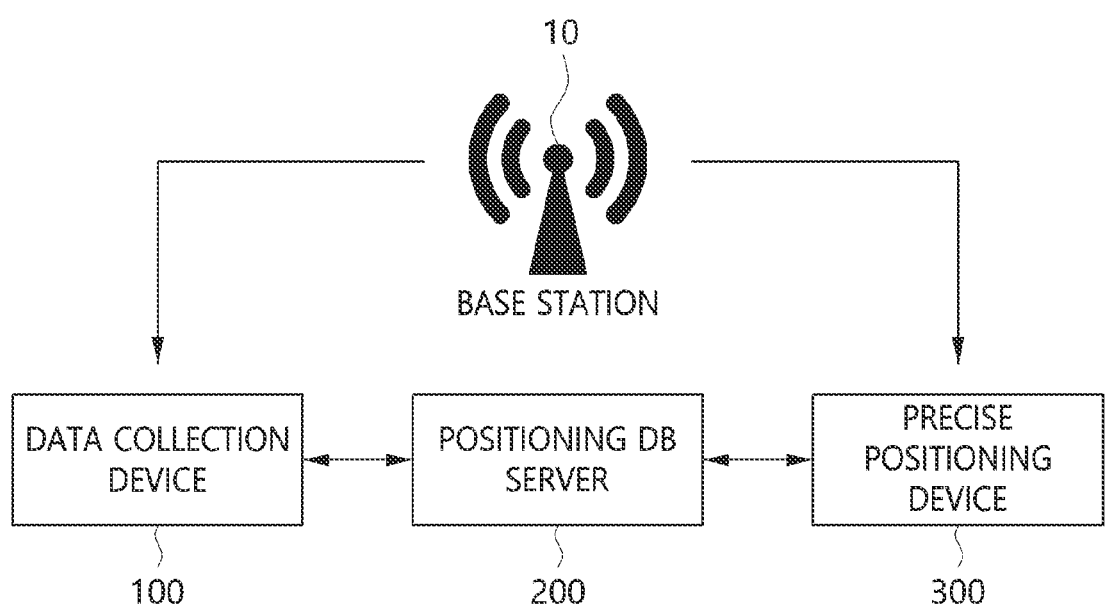
FIG. 1 is a view illustrating an apparatus for precise positioning based on deep learning according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a view illustrating an apparatus for precise positioning based on deep learning according to an embodiment of the present invention.

Referring to FIG. 1, the apparatus for precise positioning based on deep learning according to an embodiment of the present invention includes a data collection device 100, a positioning DB server 200, and a precise positioning device 300.

The data collection device 100 may receive multi-channel or multi-antenna wireless signal data transmitted from a base station 10 and transmit the same to the positioning DB server 200.

The positioning DB server 200 may generate a deep-learning-based positioning DB model by preprocessing the received multi-channel or multi-antenna wireless signal data.

Here, the positioning DB server 200 may receive wireless signal data for positioning from the precise positioning device 300, may perform precise positioning using the positioning DB model, and may transmit the result of positioning to the precise positioning device 300.

The precise positioning device 300 may collect multi-channel or multi-antenna wireless signal data from a location for which positioning is required, may request location information pertaining to the wireless signal data from the positioning DB server 200 by transmitting the wireless signal data for positioning to the positioning DB server, and may receive the result of positioning.

The apparatus for precise positioning based on deep learning according to an embodiment of the present invention may be implemented as a single computing device including the components and functions of the data collection device 100, the positioning DB server 200, and the precise positioning device 300.

The apparatus for precise positioning based on deep learning may set a collection location and a collection environment for which positioning is required.

Here, the apparatus for precise positioning based on deep learning may collect wireless signal data based on the collection location and the collection environment.

Here, the apparatus for precise positioning based on deep learning may generate a magnitude map image from the wireless signal data, and may generate a positioning DB model by learning the image characteristics of the magnitude map image through deep-learning-based training.

Here, the apparatus for precise positioning based on deep learning may generate a magnitude map image from the wireless signal data, and may estimate the location information pertaining to the wireless signal data based on the image characteristics of the magnitude map image using the positioning DB model.

Here, the wireless signal data may be a Channel State Information Reference Signal (CSI-RS).

Here, the magnitude map image may be a graph that represents the magnitude data of a frequency response for each subcarrier of the CSI-RS.

Here, the magnitude map image may be the graph in which the magnitude data of a frequency response for each OFDM symbol index is further considered, in addition to the magnitude data of the frequency response for each subcarrier.

Here, the magnitude map image may be the graph represented as multiple graphs so as to correspond to CSI-RSs collected from multiple channels at the collection location.

Here, the apparatus for precise positioning based on deep learning may generate the positioning DB model by learning the image characteristics of the magnitude map image and information about the collection location of the wireless signal data through deep-learning-based training.

Here, the apparatus for precise positioning based on deep learning may determine the similarity of image characteristics between the magnitude map image and each of the previously learned magnitude map images included in the positioning DB model, and may estimate the location information pertaining to the wireless signal data from the information about the collection location of the previously learned magnitude map image having the highest similarity.

Here, the apparatus for precise positioning based on deep learning may determine the positioning accuracy of the wireless signal data for positioning by selecting the label value (location number) of the location information pertaining to the wireless signal data for training that matches the wireless signal data for positioning when the image characteristics of the magnitude map images for positioning are input to the positioning DB model.

Here, the image characteristics may be the number of graphs and the patterns thereof.

Figure 2:
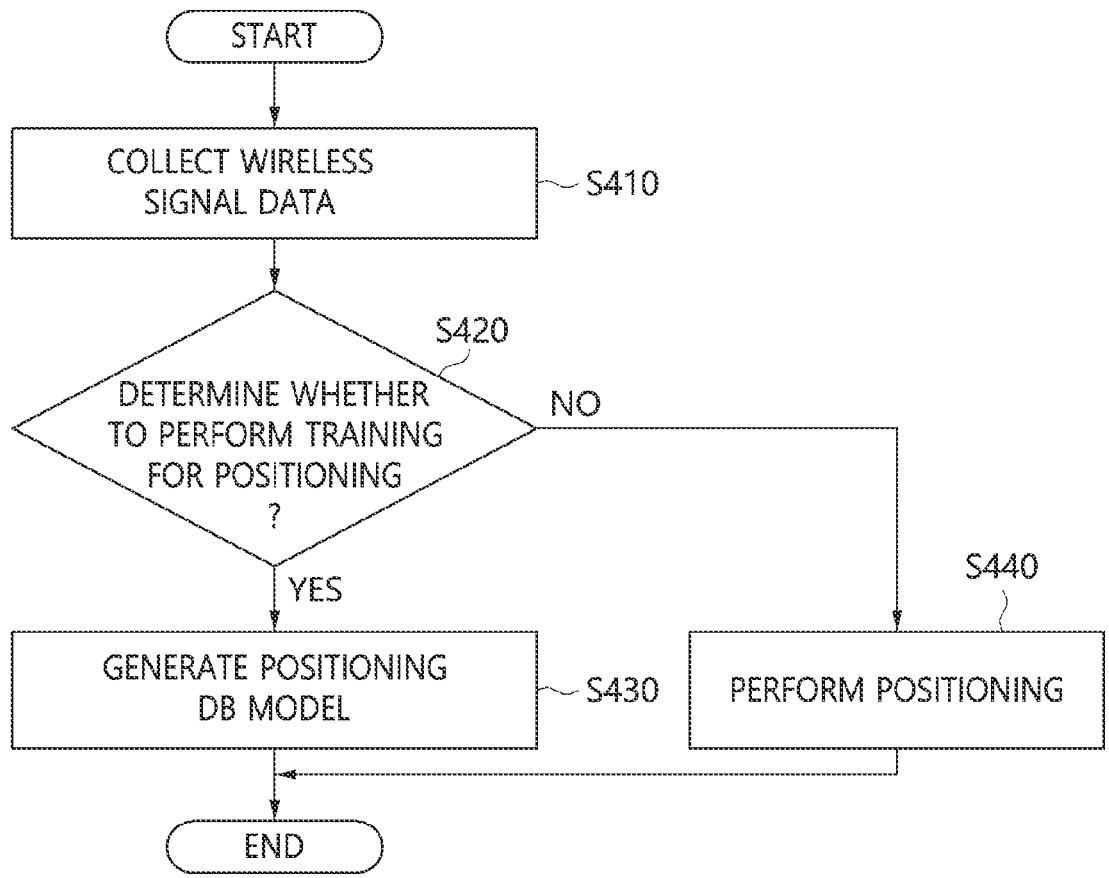
FIG. 2 is a flowchart illustrating a method for precise positioning based on deep learning according to an embodiment of the present invention.
Figure 3:
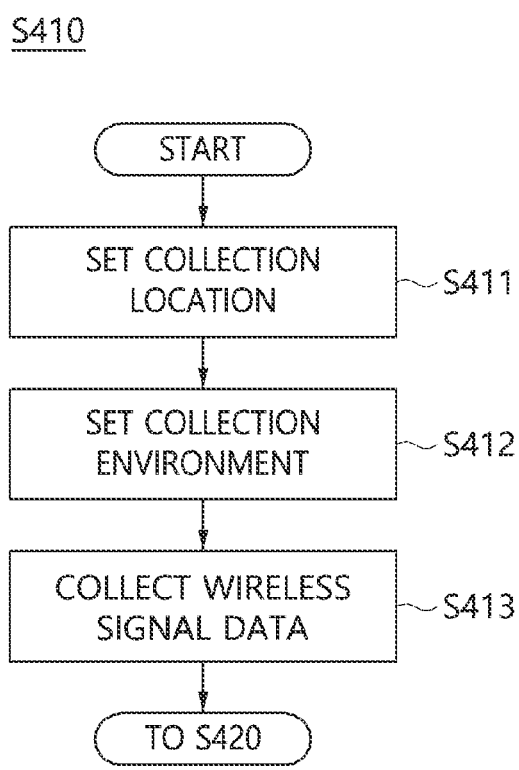
FIG. 3 is a flowchart illustrating in detail an example of the wireless signal data collection step illustrated in FIG. 2.
Figure 4:
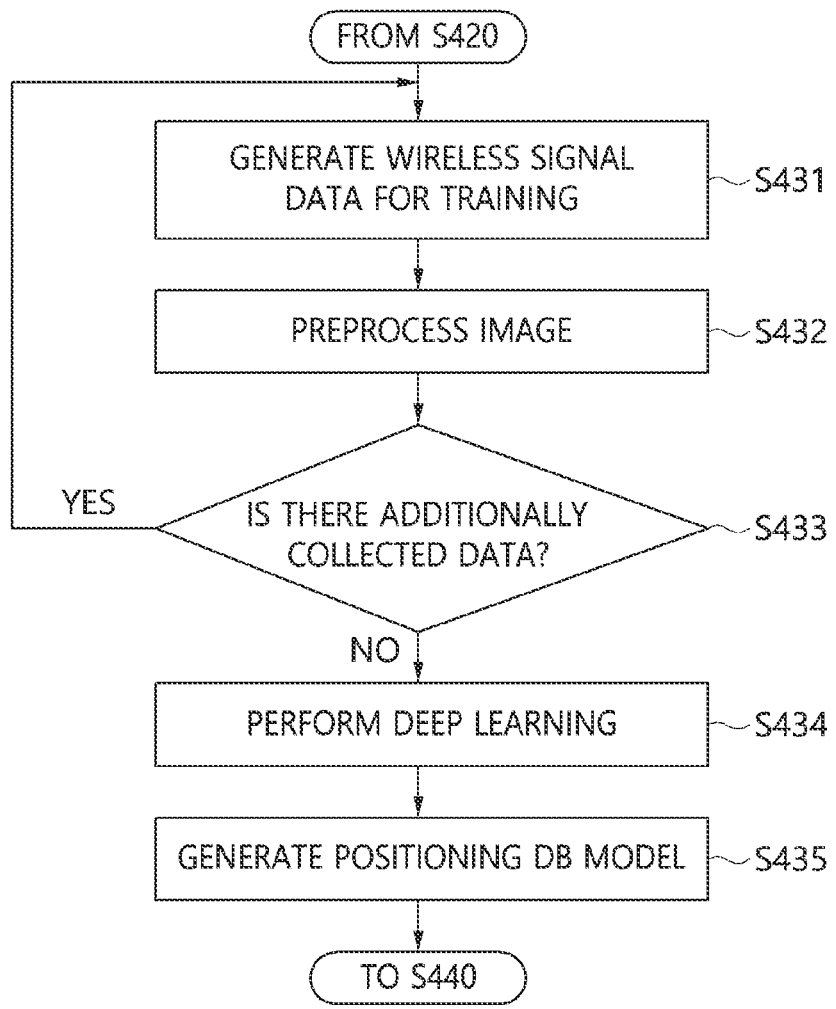
FIG. 4 is a flowchart illustrating in detail an example of the positioning DB model generation step illustrated in FIG. 2.
Figure 5:
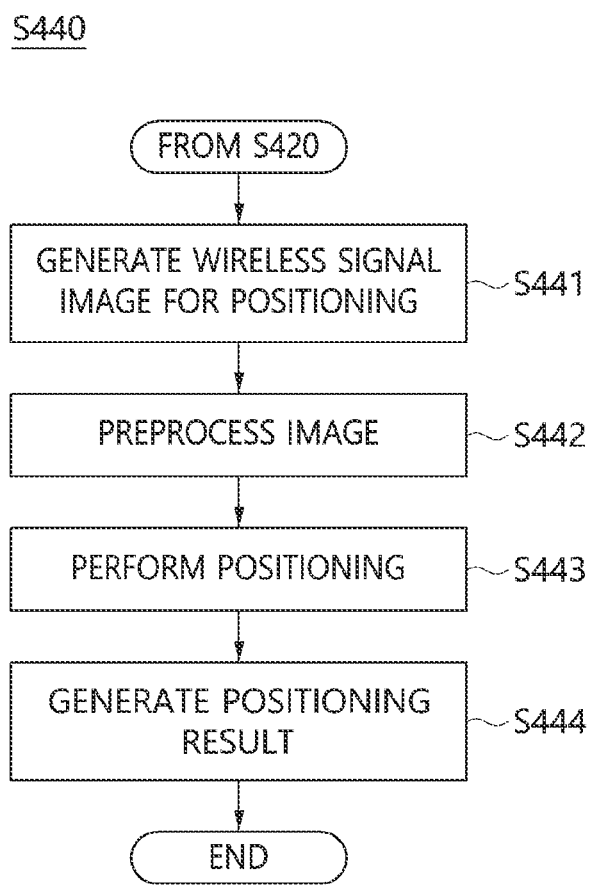
FIG. 5 is a flowchart illustrating in detail an example of the positioning step illustrated in FIG. 2.

FIG. 2 is a flowchart illustrating a method for precise positioning based on deep learning according to an embodiment of the present invention. FIG. 3 is a flowchart illustrating in detail an example of the wireless signal data collection step illustrated in FIG. 2. FIG. 4 is a flowchart illustrating in detail an example of the positioning DB model generation step illustrated in FIG. 2. FIG. 5 is a flowchart illustrating in detail an example of the positioning step illustrated in FIG. 2.

Referring to FIG. 2, in the method for precise positioning based on deep learning according to an embodiment of the present invention, first, wireless signal data may be collected at step S410.

That is, at step S410, a collection location and a collection environment may be set, and wireless signal data may be collected based on the collection location and the collection environment.

Referring to FIG. 3, at step S410, first, the collection location may be set at step S411.

That is, at step S411, the collection location may be set using the data collection device 100 while moving the same depending on the collection environment.

Here, at step S411, wireless signal data may be dynamically collected while moving along a collection path after the collection path is set. Alternatively, multiple fixed points are set in the collection location, after which wireless signal data may be statically collected from the respective points.

Here, at step S411, collection location information with which the training data of the positioning DB model will be labelled may be generated using the GPS location information of a GPS sensor included in the data collection device 100 or using the coordinates of the preset collection location.

Also, at step S410, the collection environment may be set at step S412.

That is, at step S412, settings related to the wireless signal data to collect, that is, a communication company, a frequency, a band, or the like, may be set.

Also, at step S410, wireless signal data may be collected at step S413.

That is, at step S413, after the collection location and the collection environment are set, wireless signal data may be collected along the set collection path or in the set collection location.

Also, in the method for precise positioning based on deep learning according to an embodiment of the present invention, whether to perform training for positioning may be determined at step S420.

That is, at step S420, when the wireless signal data is collected for training, a positioning DB model may be generated at step S430 using the wireless signal data as training data, whereas when the wireless signal data is collected for positioning in order to estimate the location, positioning may be performed at step S440 using the wireless signal data as positioning data.

Here, at step S420, when the positioning DB server 200 is used, the collected wireless signal data may be transmitted thereto.

Also, in the method for precise positioning based on deep learning according to an embodiment of the present invention, a positioning DB model may be generated at step S430.

That is, at step S430, a magnitude map image for training may be generated from the wireless signal data, and a positioning DB model may be generated by learning the image characteristics of the magnitude map image for training through deep-learning-based training.

Referring to FIG. 4, at step S430, first, a wireless signal magnitude map image for training may be generated at step S431.

That is, at step S431, a magnitude map image for training, which is capable of reflecting the characteristics of multichannel or multi-antenna wireless signal data, may be generated.

Figure 6:
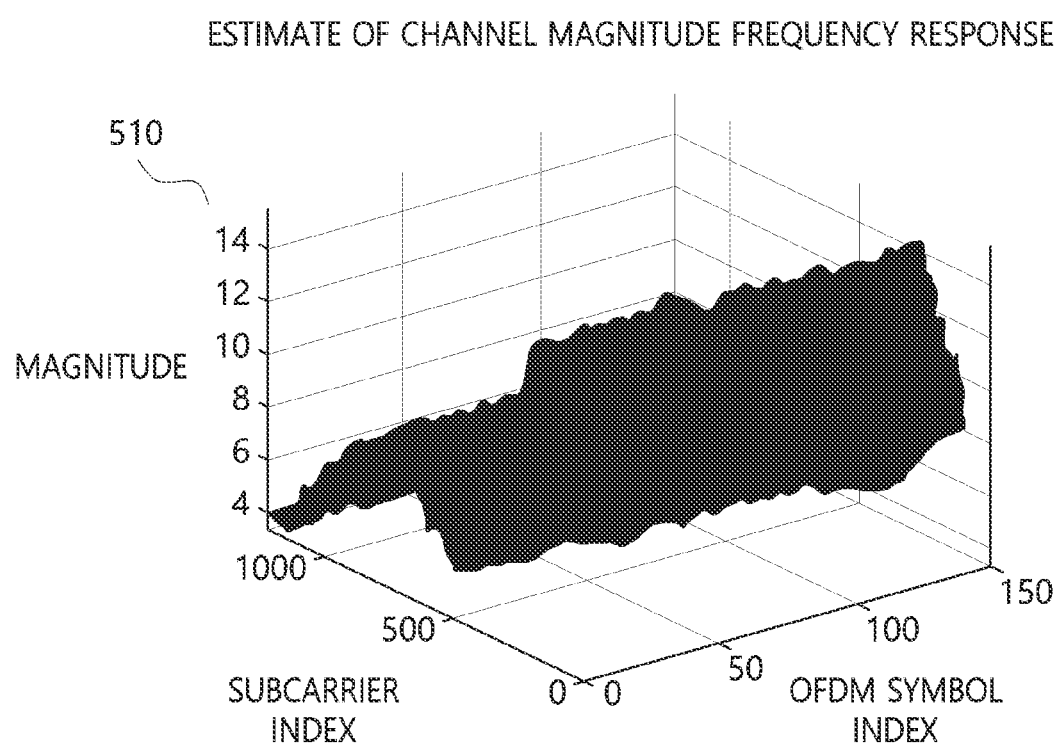
FIG. 6 is a view illustrating a 3D magnitude map image according to an embodiment of the present invention.
Figure 7:
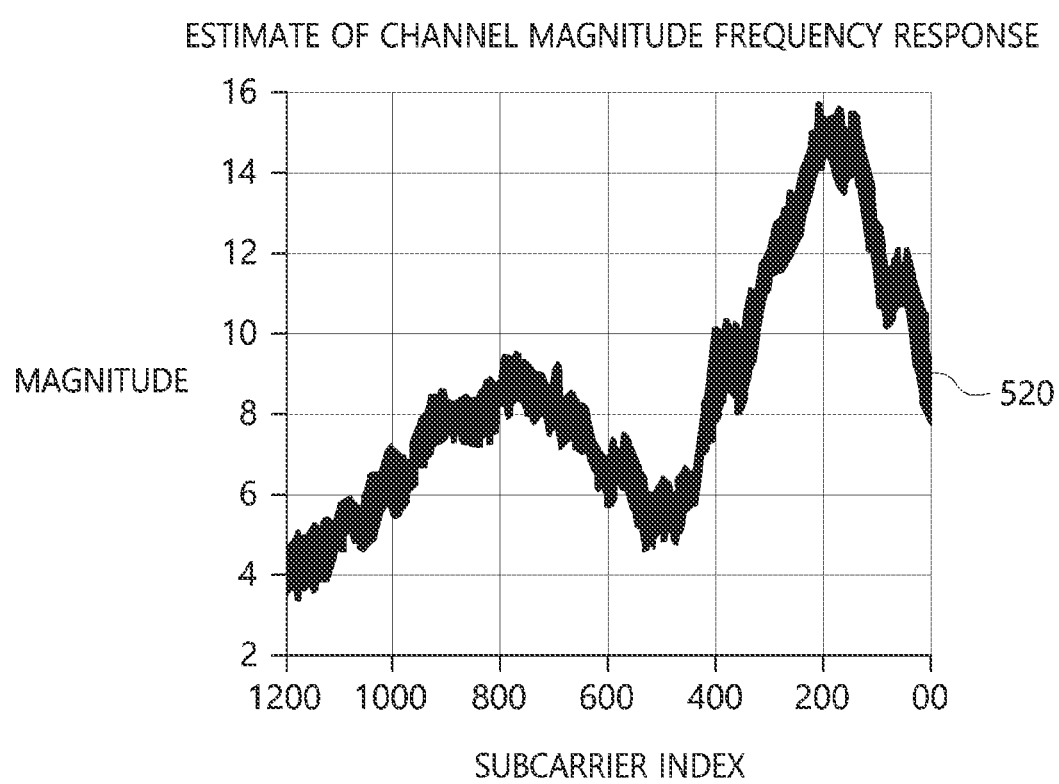
FIG. 7 is a view illustrating a 2D magnitude map image according to an embodiment of the present invention.

FIG. 6 is a view illustrating a 3D magnitude map image according to an embodiment of the present invention. FIG. 7 is a view illustrating a 2D magnitude map image according to an embodiment of the present invention.

Here, the wireless signal data may be a Channel State Information Reference Signal (CSI-RS).

Here, the magnitude map image may be a graph that represents the magnitude data of a frequency response for each subcarrier of the CSI-RS.

Here, the magnitude map image may be the graph in which the magnitude data of a frequency response for each OFDM symbol index is further considered, in addition to the magnitude data of the frequency response for each subcarrier.

Here, the magnitude map image may be the graph represented as multiple graphs so as to correspond to CSI-RSs collected from multiple channels in the collection location.

Here, at step S431, a 3D magnitude map image of the subcarrier for each OFDM symbol of the CSI-RS may be generated.

Referring to FIG. 6, it can be seen that a 3D magnitude map image 510 of the subcarrier for each OFDM symbol of a CSI-RS that is received from a single base station is illustrated.

Here, at step S431, a 2D magnitude map image of each subcarrier of the CSI-RS may be generated.

Here, at step S431, the 2D magnitude map image may be alternatively generated from the 3D magnitude map image.

Referring to FIG. 7, it can be seen that a 2D magnitude map image 520 that is represented in 2D by projecting the OFDM symbol index in the 3D magnitude map image 510 illustrated in FIG. 6 on a subcarrier index is illustrated.

Also, at step S430, image preprocessing may be performed at step S432.

That is, at step S432, filtering is performed with the total magnitude of the subcarrier for each OFDM symbol, whereby a preprocessed magnitude map image in which the optimal OFDM symbol index is selected may be acquired.

Figure 8:
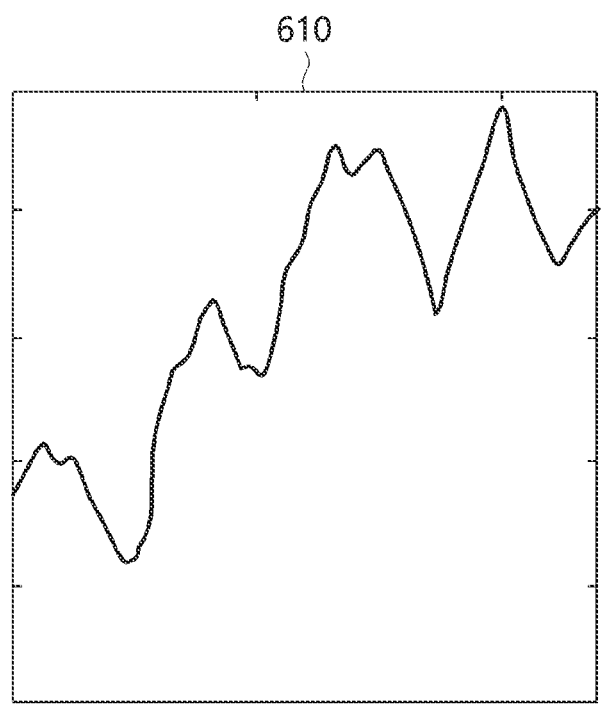
FIG. 8 is a view illustrating a preprocessed magnitude map image according to an embodiment of the present invention.
Figure 9:
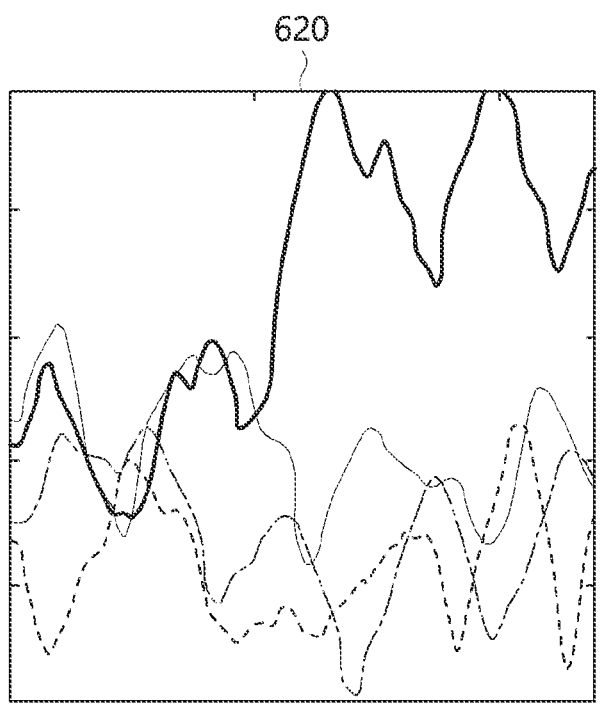
FIG. 9 is a view illustrating a preprocessed magnitude map image of multiple subcarriers according to an embodiment of the present invention.

FIG. 8 is a view illustrating a preprocessed magnitude map image according to an embodiment of the present invention. FIG. 9 is a view illustrating a preprocessed magnitude map image of multiple subcarriers according to an embodiment of the present invention.

Referring to FIG. 8, it can be seen that the preprocessed magnitude map image 610 represents a magnitude map image that is preprocessed by filtering the magnitude map image of a CSI-RS received using a single antenna.

Referring to FIG. 9, it can be seen that the preprocessed image 620 represents a magnitude map image that is preprocessed by filtering the magnitude map image of 2×2 Multi-Input and Multi-Output (MIMO) CSI-RSs received using two antennas.

Here, it can be seen that four graphs are represented using different types of lines in order to represent the 2×2 MIMO CSI-RSs, and the four graphs may be alternatively represented using different colors.

Also, at step S430, whether additionally collected wireless signal data is present may be checked at step S433.

That is, when it is determined at step S433 that additionally collected wireless signal data is present, a magnitude map image for training may be generated for the additionally collected wireless signal data at step S431.

Also, at step S430, deep-learning-based training may be performed at step S434.

That is, at step S434, the positional DB model may be generated by learning the image characteristics of the preprocessed magnitude map image for training and the information about the collection location of the wireless signal data through deep-learning-based training.

Here, the image characteristics may be the number of graphs, the type of the lines thereof, the colors thereof, and the patterns thereof.

Here, at step S434, training data that is labeled with the information about the collection location of the wireless signal data and that is grouped by factors such as the number of graphs, the patterns thereof, the colors thereof, the type of the lines thereof, noise, and the like, which are the image characteristics of the preprocessed magnitude map image for training, may be generated, and the positioning DB model may be generated by learning the training data.

Also, in the method for precise positioning based on deep learning according to an embodiment of the present invention, positioning may be performed at step S440.

That is, at step S440, a magnitude map image for positioning may be generated from the wireless signal data, and location information pertaining to the wireless signal data may be estimated based on the image characteristics of the magnitude map image for positioning using the positioning DB model.

Referring to FIG. 5, at step S440, first, a wireless signal magnitude map image for positioning may be generated at step S441.

That is, at step S441, a magnitude map image for positioning, which is capable of reflecting the characteristics of multi-channel or multi-antenna wireless signal data, may be generated.

Here, the wireless signal data may be a Channel State Information Reference Signal (CSI-RS).

Here, the magnitude map image may be a graph that represents the magnitude data of a frequency response for each subcarrier of the CSI-RS.

Here, the magnitude map image may be the graph in which the magnitude data of a frequency response for each OFDM symbol index is further considered, in addition to the magnitude data of the frequency response for each subcarrier.

Here, the magnitude map image may be the graph represented as multiple graphs so as to correspond to CSI-RSs collected from multiple channels in the collection location.

Here, at step S441, a 3D magnitude map image of the subcarrier for each OFDM symbol of the CSI-RS may be generated.

Referring to FIG. 6, it can be seen that a 3D magnitude map image 510 of the subcarrier for each OFDM symbol of a CSI-RS that is received from a single base station is illustrated.

Here, at step S441, a 2D magnitude map image of each subcarrier of the CSI-RS may be generated.

Here, at step S441, a 2D magnitude map image may be alternatively generated from the 3D magnitude map image.

Referring to FIG. 7, it can be seen that a 2D magnitude map image 520 that is represented in 2D by projecting the OFDM symbol index in the 3D magnitude map image 510 illustrated in FIG. 6 on a subcarrier index is illustrated.

Also, at step S440, image preprocessing may be performed at step S442.

That is, at step S442, filtering is performed with the total magnitude of the subcarrier for each OFDM symbol, whereby a preprocessed magnitude map image in which the optimal OFDM symbol index is selected may be acquired.

Referring to FIG. 8, it can be seen that the preprocessed magnitude map image 610 represents a magnitude map image that is preprocessed by filtering the magnitude map image of a CSI-RS received using a single antenna.

Referring to FIG. 9, it can be seen that the preprocessed image 620 represents a magnitude map image that is preprocessed by filtering the magnitude map image of 2×2 MIMO CSI-RSs received using two antennas.

Here, it can be seen that four graphs are represented using different types of lines in order to represent the 2×2 MIMO CSI-RSs, and the four graphs may be alternatively represented using different colors.

Also, at step S440, positioning for estimating location information pertaining to the wireless signal data may be performed at step S443.

That is, at step S443, the similarity of image characteristics between the magnitude map image for positioning and each of the previously learned magnitude map images included in the positioning DB model may be determined, and location information pertaining to the wireless signal data may be estimated from the information about the collection location of the previously learned magnitude map image having the highest similarity.

Here, the image characteristics may be the number of graphs, the type of the lines thereof, the colors thereof, and the patterns thereof.

Here, at step S443, positioning data that is grouped by factors such as the number of graphs, the patterns thereof, the colors thereof, the type of lines thereof, noise, and the like, which are the image characteristics of the preprocessed magnitude map image for positioning, may be generated, and, using the positioning data, the location information pertaining to the wireless signal data may be estimated from the positioning DB model.

Here, at step S443, the positioning accuracy of the wireless signal data for positioning may be determined by selecting the label value (location number) of the location information pertaining to the wireless signal data for training that matches the wireless signal data for positioning when the image characteristics of the magnitude map images for positioning are input to the positioning DB model.

Also, at step S440, a positioning result may be generated at step S444.

That is, at step S444, a positioning result may be generated from the estimated location information, and the positioning result may be output or transmitted to the device that requested the positioning result.

Here, at step S444, when an additional request for positioning is received, wireless signal data may be additionally collected based on the set collection location and collection environment.

General wireless signal data is mixed with noise depending on the surrounding environment. Accordingly, precise positioning cannot be performed using existing feature-based image-matching technology, such as scale-invariant feature transform (SIFT) or histogram of oriented gradients (HOG), but the apparatus and method for precise positioning based on deep learning according to an embodiment of the present invention enable location information pertaining to wireless signal data to be precisely estimated from the result of learning the magnitude map images of a CSI-RS.

Figure 10:
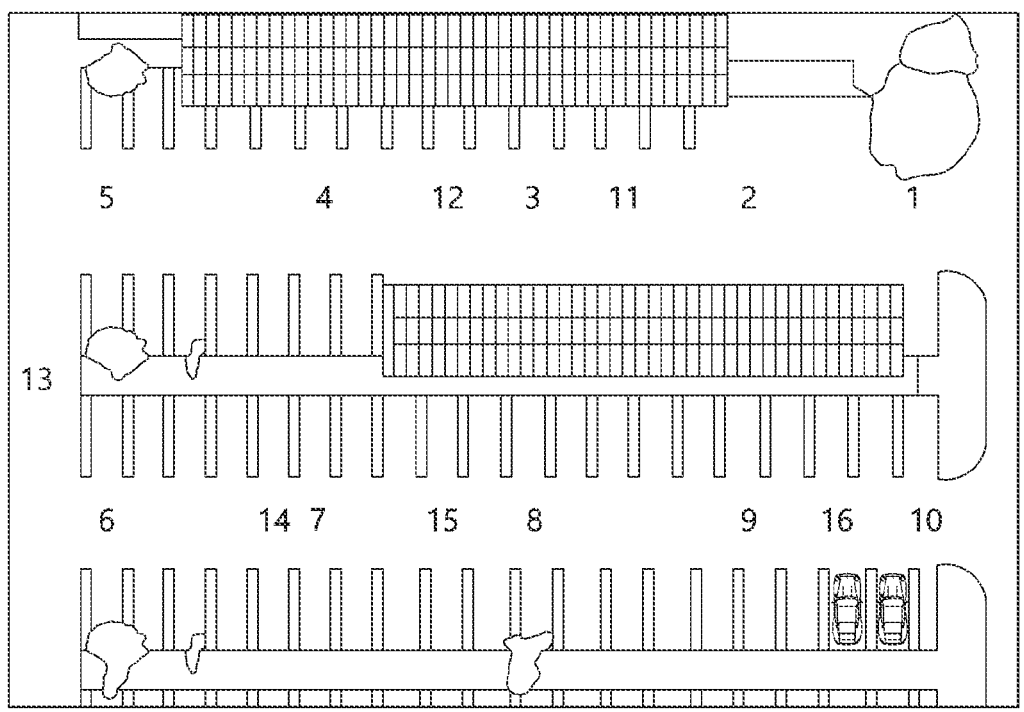
FIG. 10 is a view illustrating the location where wireless signal data is collected and a collection environment according to an embodiment of the present invention.
Figure 11:
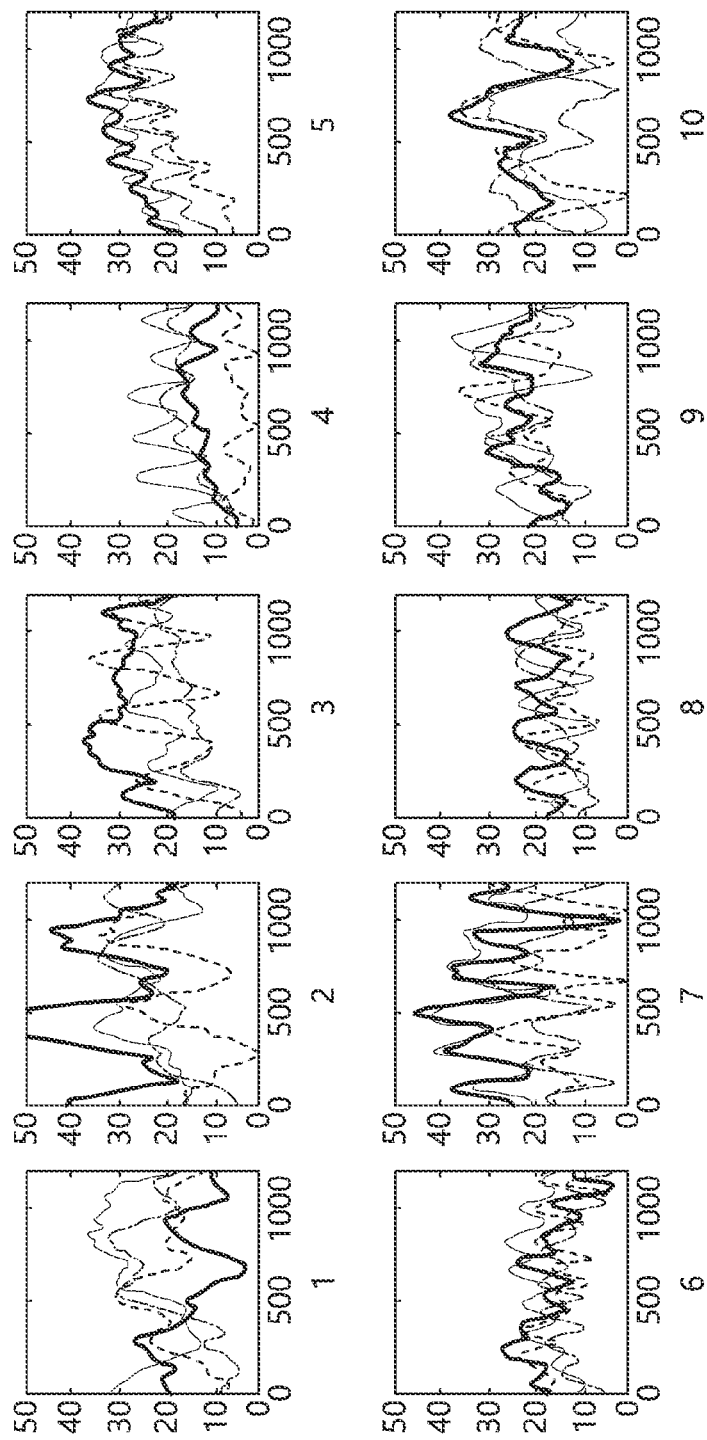
FIG. 11 is a view illustrating magnitude map images for training that are collected from the wireless signal data collection location illustrated in FIG. 10.
Figure 12:
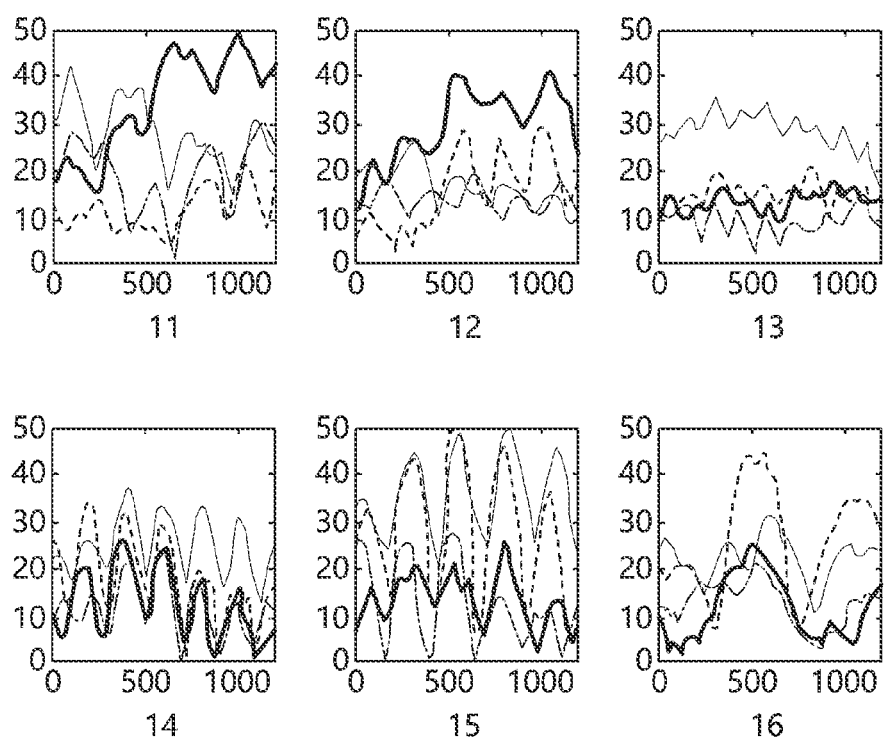
FIG. 12 is a view illustrating magnitude map images for positioning that are collected from the wireless signal data collection location illustrated in FIG. 10.
Figure 13:
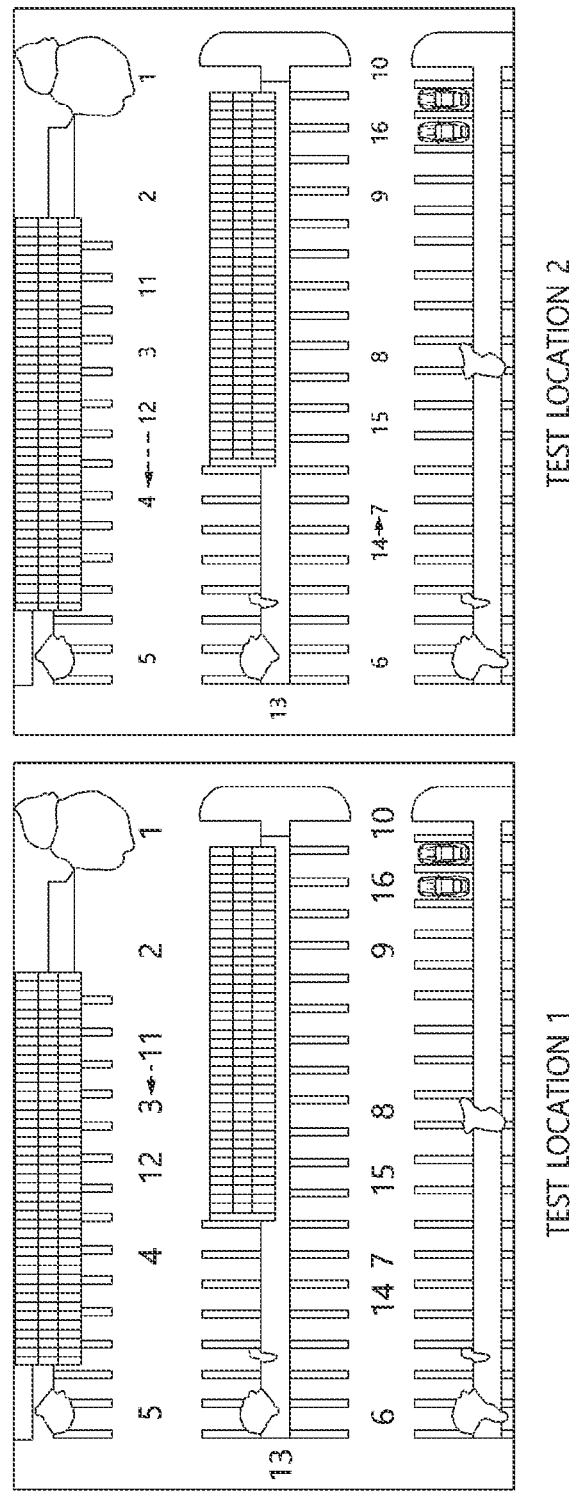
FIGS. 13 to 15 are views illustrating positioning results estimated using the magnitude map images of FIG. 11 and FIG. 12.
Figure 14:
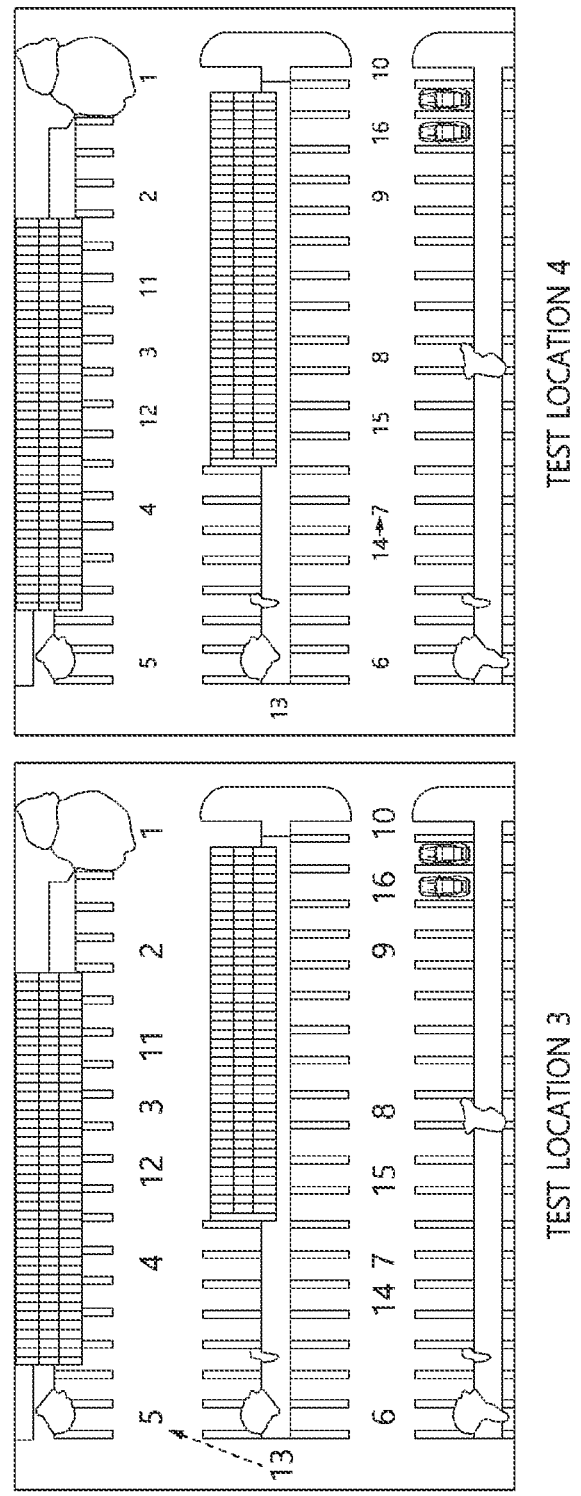
Figure 15:
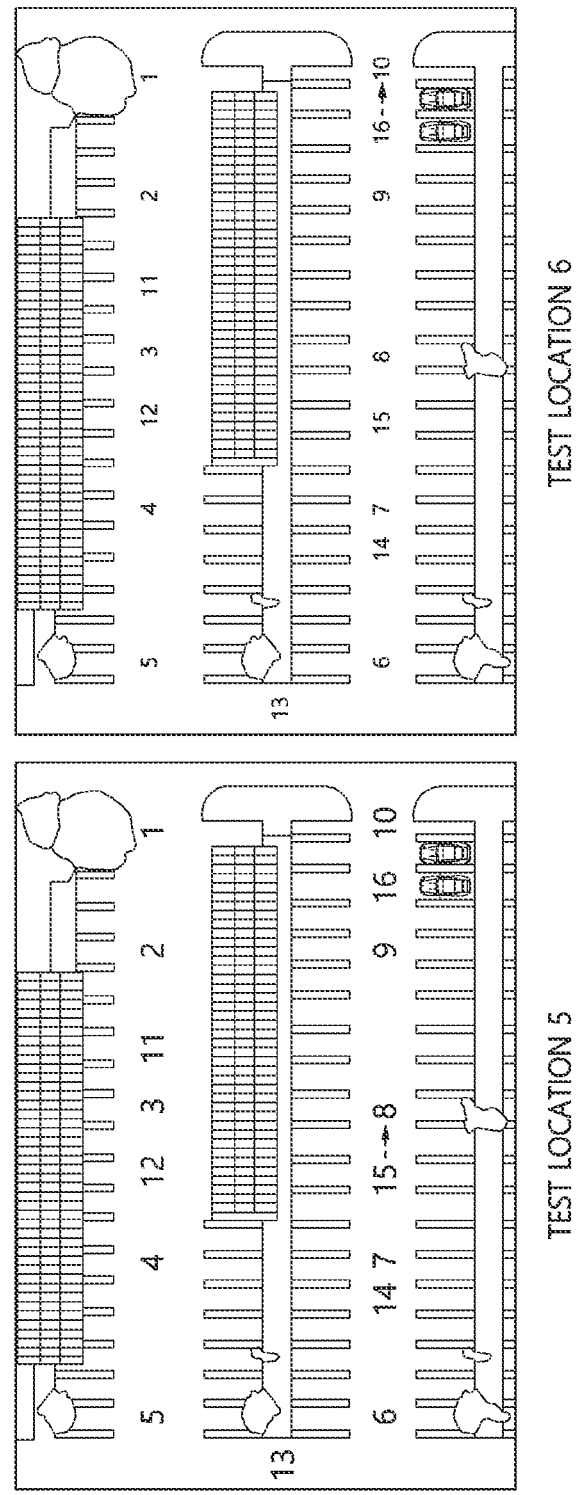

FIG. 10 is a view illustrating a location in which wireless signal data is collected and a collection environment thereof according to an embodiment of the present invention. FIG. 11 is a view illustrating magnitude map images for training that are collected from the wireless signal data collection location illustrated in FIG. 10. FIG. 12 is a view illustrating magnitude map images for positioning that are collected from the wireless signal data collection location illustrated in FIG. 10. FIGS. 13 to 15 are views illustrating the positioning result estimated using the magnitude map images of FIG. 11 and FIG. 12.

Referring to FIG. 10, it can be seen that the location in which wireless signal data is collected and the collection environment thereof according to an embodiment of the present invention are illustrated.

Here, an embodiment in which the collection location and the collection environment are set by selecting ten locations at intervals of about 10 m in an outdoor parking lot, in which a positioning DB model is generated based on actual commercial LTE signals received at the ten locations, and in which positioning is performed at a test location is illustrated. Here, using a collection device, 2×2 MIMO CSI-RS data is collected using two antennas.

The first to tenth locations (locations 1 to 10) indicate the locations from which wireless signal data for training, which is necessary for generating a positioning DB, is collected, and the 11th to 16th locations (locations 11 to 16) indicate the locations from which wireless signal data for positioning, which is necessary for performing positioning, is collected.

Referring to FIG. 11, it can be seen that magnitude map images for training that are generated from the wireless signal data for training collected from the first to tenth locations (locations 1 to 10) are illustrated.

Here, the positioning DB model may be generated from the first to tenth magnitude map images for training through deep-learning-based training.

Referring to FIG. 12, it can be seen that magnitude map images for positioning that are generated from the wireless signal data for positioning collected from the 11th to 16th locations (locations 11 to 16) are illustrated.

Here, the apparatus for precise positioning based on deep learning may estimate location information pertaining to the wireless signal data for positioning using the magnitude map images for positioning, corresponding to the 11th to 16th locations (locations 11 to 16), and using the positioning DB model generated from the wireless signal data collected from the first to tenth locations (locations 1 to 10).

Here, the apparatus for precise positioning based on deep learning may determine positioning accuracy by selecting the label value (location number) of the location information pertaining to the wireless signal data for training that matches the wireless signal data for positioning when the image characteristics of the magnitude map images for positioning, corresponding to the 11th to 16th locations (locations 11 to 16), are input to the positioning DB model.

Referring to FIGS. 13 to 15, it can be seen that the positioning results estimated using the magnitude map images of FIG. 11 and FIG. 12 are illustrated.

Here, with regard to most of the wireless signal data (locations 1 to 10) collected from the six respective test locations, the locations thereof are estimated as the collection locations that are closest thereto, and it can be seen that an average accuracy of 5 m is achieved.

Figure 16:
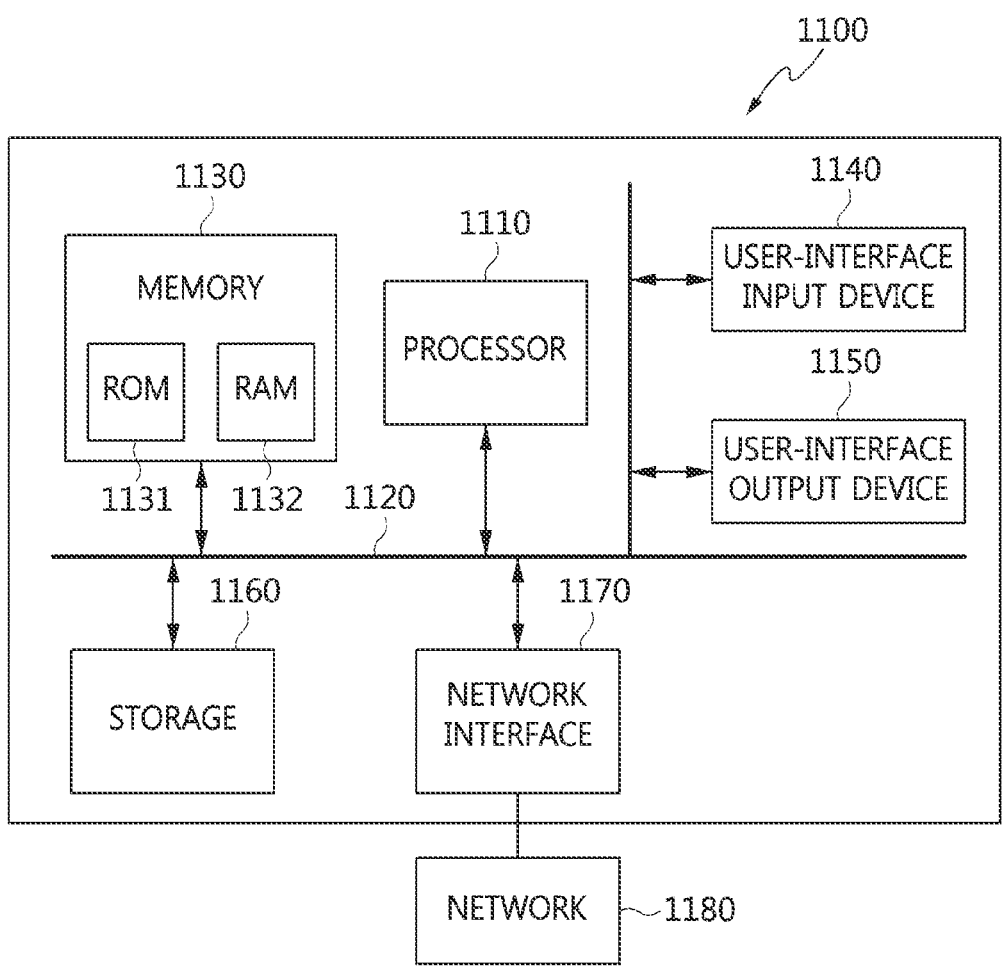
FIG. 16 is a view illustrating a computer system according to an embodiment of the present invention.

FIG. 16 is a view illustrating a computer system according to an embodiment of the present invention.

Referring to FIG. 16, the data collection device 100, the positioning DB server 200, and the precise positioning device 300 according to an embodiment of the present invention may be implemented in a computer system 1100 including a computer-readable recording medium. As illustrated in FIG. 16, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

An apparatus for precise positioning based on deep learning according to an embodiment of the present invention may be implemented as a single computing device including a data collection device 100, a positioning DB server 200, and a precise positioning device 300, and may include one or more processors 1110 and executable memory 1130 for storing at least one program executed by the one or more processors 1110. The at least one program may set a collection location and a collection environment, collect wireless signal data based on the collection location and the collection environment, generate a magnitude map image for training from the wireless signal data, generate a positioning DB model by learning the image characteristics of the magnitude map image for training through deep-learning-based training, generate a magnitude map image from the wireless signal data, and estimate location information pertaining to the wireless signal data based on the image characteristics of the magnitude map image using the positioning DB model.

Here, the wireless signal data may be a Channel State Information Reference Signal (CSI-RS).

Here, the magnitude map image may be a graph that represents the magnitude data of a frequency response for each subcarrier of the CSI-RS.

Here, the magnitude map image may be the graph in which the magnitude data of a frequency response for each OFDM symbol index is further considered, in addition to the magnitude data of the frequency response for each subcarrier.

Here, the magnitude map image may be the graph represented as multiple graphs so as to correspond to CSI-RSs collected from multiple channels in the collection location.

Here, the at least one program may generate the positioning DB model by learning the image characteristics of the magnitude map image for training and information about the collection location of the wireless signal data through deep-learning-based training.

Here, the at least one program may determine the similarity of the image characteristics between the magnitude map image and each of the previously learned magnitude map images included in the positioning DB model, and may estimate the location information pertaining to the wireless signal data from the information about the collection location of the previously learned magnitude map image having the highest similarity.

Here, the at least one program may determine the positioning accuracy of the wireless signal data for positioning by selecting the label value (location number) of the location information pertaining to the wireless signal data for training that matches the wireless signal data for positioning when the image characteristics of the magnitude map images for positioning are input to the positioning DB model.

Here, the image characteristics may be the number of graphs and the patterns thereof.

The present invention may improve the low positioning accuracy of an existing positioning method that uses the location of a base station and signal strength, and may enable positioning in places in which GPS is not available.

Also, the present invention may provide positioning technology having high precision based on wireless communication infrastructure in various fields through a general-purpose and more precise positioning method, rather than depending on communication companies and information about repeaters and base stations.

As described above, the apparatus and method for precise positioning based on deep learning according to the present invention are not limitedly applied to the configurations and operations of the above-described embodiments, but all or some of the embodiments may be selectively combined and configured, so that the embodiments may be modified in various ways.

What is claimed is:

1. A method for precise positioning based on deep learning, performed by an apparatus for precise positioning based on deep learning, comprising:
    setting a collection location and a collection environment and collecting wireless signal data based on the collection location and the collection environment; and
    generating a magnitude map image for training from the wireless signal data and learning image characteristics of the magnitude map image for training through deep-learning-based training, thereby generating a positioning DB model,
    wherein the wireless signal data is a Channel State Information Reference Signal (CSI-RS), and
    wherein the magnitude map image is a graph that represents magnitude data of a frequency response for each subcarrier of the CSI-RS.

2. The method of claim 1,
    wherein the magnitude map image is the graph in which magnitude data of a frequency response for each OFDM symbol index is further considered, in addition to the magnitude data of the frequency response for the each subcarrier.

3. The method of claim 2,
    wherein the magnitude map image is the graph represented as multiple graphs so as to correspond to CSI-RSs collected from multiple channels in the collection location.

4. The method of claim 3,
    wherein generating the positioning DB model is configured to generate the positioning DB model by learning the image characteristics of the magnitude map image for training and information about the collection location of the wireless signal data through the deep-learning-based training.

5. The method of claim 4,
    wherein the image characteristics are a number of graphs and patterns thereof.

6. An apparatus for precise positioning based on deep learning, comprising:
    one or more processors; and
    executable memory for storing at least one program executed by the one or more processors,
    wherein the at least one program is configured to set a collection location and a collection environment and collect wireless signal data based on the collection location and the collection environment; and
    wherein the at least one program is configured to generate a magnitude map image for training from the wireless signal data and generate a positioning DB model by learning image characteristics of the magnitude map image for training through deep-learning-based training,
    wherein the wireless signal data is a Channel State Information Reference Signal (CSI-RS), and wherein the magnitude map image is a graph that represents magnitude data of a frequency response for each subcarrier of the CSI-RS.

7. The apparatus of claim 6,
wherein the magnitude map image is the graph in which magnitude data of a frequency response for each OFDM symbol index is further considered, in addition to the magnitude data of the frequency response for the each subcarrier.

8. The apparatus of claim 7,
wherein the magnitude map image is the graph represented as multiple graphs so as to correspond to CSI-RSs collected from multiple channels in the collection location.

9. The apparatus of claim 8,
wherein the at least one program determines a similarity of image characteristics between the magnitude map image and each of previously learned magnitude map images included in the positioning DB model and estimates the location information pertaining to the wireless signal data from information about a collection location of a previously learned magnitude map image having a highest similarity.

10. The apparatus of claim 9,
wherein the image characteristics are a number of graphs and patterns thereof.

* * * * *